United States Patent [19]
Steyn

[11] Patent Number: 6,007,932
[45] Date of Patent: Dec. 28, 1999

[54] TUBULAR FUEL CELL ASSEMBLY AND METHOD OF MANUFACTURE

[75] Inventor: Willem J. Steyn, Jackson, N.J.

[73] Assignee: Gore Enterprise Holdings, Inc., Newark, Del.

[21] Appl. No.: 08/731,588

[22] Filed: Oct. 16, 1996

[51] Int. Cl.⁶ .................................................. H02M 8/10
[52] U.S. Cl. ........................... 429/31; 429/32; 427/115; 29/623.4
[58] Field of Search ............................. 429/31, 32, 127, 429/94; 427/115; 29/623.4

[56] References Cited

U.S. PATENT DOCUMENTS

3,185,593  5/1965  Coleman et al. ......................... 429/94
3,281,271  10/1966  Comanor et al. ......................... 429/94

*Primary Examiner*—Stephen Kalafut
*Attorney, Agent, or Firm*—Allan M. Wheatcraft

[57] ABSTRACT

A fuel cell assembly including a porous tubular substrate made from a fluid-permeable material, and a plurality of elongated flexible polymer electrolyte fuel cells wound in side by side relation onto the substrate. Each elongated cell includes a central proton exchange membrane, a cathode element mounted on one side of said membrane and an anode element mounted on the other side of said membrane. In a preferred arrangement, the anode element of a first elongated wound fuel cell is in electrical contact with the cathode element of an adjacently wound fuel cell.

31 Claims, 5 Drawing Sheets

FIG. 4

TUBULAR FUEL CELL ASSEMBLY AND METHOD OF MANUFACTURE

FIELD OF THE INVENTION

This invention relates to fuel cells, and more particularly to an improved method of fabricating fuel cell assemblies, particularly Polymer Electrolyte or Proton Exchange Membrane (PEM) fuel cells.

BACKGROUND OF THE INVENTION

Fuel cells are electrochemical energy conversion devices which have been considered as an alternative for the conversion of energy to heat engines which are limited by their inherent thermodynamics. The concept of fuel cells has been generally known since the early 1960's when fuel cells were introduced as energy storage devices in the Gemini portion of the NASA space program.

A typical fuel cell consists of three components- two electrodes; that is, a cathodic element and an anodic element, and a bridging electrolyte which is sandwiched therebetween. Historically, fuel cells have been classified by means of the electrolyte utilized. To date, five classifications of fuel cells are known: Polymer Electrolyte Membrane (also referred to as Proton Exchange Membrane Fuel Cells (PEM), Alkaline Fuel Cells (AFC), Phosphoric Acid Fuel Cells (PAFC), Molten Carbonate Fuel Cells (MCFC), and Solid Oxide Fuel Cells (SOFC).

PEM-type fuel cells are particularly advantageous over the remaining types of fuel cells for various reasons. One advantage is the solid nature of the electrolyte used in the cell which minimizes the operational complications arising from the liquid electrolytes that are found in PAFCs and AFCs. Moreover, the nature of PEM-type fuel cells allow operation at relatively low temperatures (80 degrees C.) when compared to other fuel cell types, most particularly MCFCs and SOFCs which can only operate at much higher temperatures. In addition, PEM-type fuel cells are generally more efficient, have longer working lives and can maintain higher power densities than other forms of fuel cells.

PEM-type fuel cells, however, have not been commercially successful due to limitations found in currently known designs. The majority of these designs utilize flat plate geometries which are assembled in a parallel arrangement—the so-called "plate and frame" approach. These designs employ rather complex, and expensive "reactant flow plate" designs.

Another disadvantage of current "plate and frame" approaches is that these fuel cells assemblies must be manually manufactured by skilled artisans, making assembly expensive and time-consuming.

Still another disadvantage are the rigidity and bulkiness of the structures which are produced using "plate and frame" fuel cell designs. That is, in order to produce adequate power, a series of plates must be assembled together and then retained in a rigid and large enclosure. Such enclosures can not be retained easily in portable applications; for example, lap-top computers.

Finally, current fuel cell designs require thermal management for efficient operation. Although plate and frame designs for heat exchangers are commonly known, this type of fuel cell construction has a competing concern in that electrical and heat loads must be concurrently managed. The result is that often a separate cooling circuit is required, requiring additional cooling plates, making the design additionally bulky as well as expensive.

Presently known PEM-type fuel cells individually produce a small amount of voltage. To produce a significant amount of energy, the cells must be electrically connected in some manner. A disclosed way of electrically interconnecting fuel cells is described in U.S. Pat. No. 5,338,623 in which the fuel cells are stacked one upon another. Plate and frame approaches utilize a similar approach, making fuel cells of this type quite bulky. To date, known tubular fuel cell constructions, such as described in U.S. Pat. No. 5,336,570, are subject to large power losses due to the requirement of a large transverse sectional area which is wound on a substrate.

Finally, fuel cells in general utilize ion transfer through the membrane to produce desired electrochemical reactions. For these reactions to occur, reactants (usually hydrogen gas at the anode and oxygen from ambient air at the cathode) must be separately supplied from each electrode side of the membrane from an external source or tank.

SUMMARY OF THE INVENTION

A primary object of the present invention is to provide an improved construction for a fuel cell, most particularly for Polymer Electrolyte Membrane (PEM) type fuel cells.

Another primary object of the present invention is to provide a fuel cell which is inexpensive to manufacture, and eliminates the complexities found in current "plate and frame" designs.

Another primary object of the present invention is to provide a fuel cell assembly and relatedly, a fabrication method which is easily adaptable to automated mass production.

Another primary object of the present invention is to provide a fuel cell assembly which allows electrical interconnection between separately aligned fuel cells in order to produce a high voltage output.

Still another primary object of the present invention is to provide a fuel cell design which does not require a separate external reactant source.

Therefore, and in accordance with an preferred aspect of the present invention, there is provided a method of fabricating a fuel cell assembly comprising the steps of:

providing a tubular substrate that permits gas to diffuse therethrough;

winding a first elongated fuel cell upon said tubular substrate, said fuel cell including a central proton exchange membrane, a cathode element mounted on one side of said membrane and an anode element mounted on the opposite side of said membrane;

winding a plurality of said elongated fuel cells upon said tubular substrate in side-by-side alignment with said first elongated fuel cell; and electrically connecting said wound elongated fuel cells to produce a fuel cell assembly.

According to another preferred aspect of the present invention, there is provided a fuel cell assembly comprising:

a tubular substrate made from a material that permits gas to diffuse therethrough;

a plurality of elongated flexible polymer electrolyte fuel cells wound in side by side relation, each fuel cell including a central proton exchange membrane, a cathode element mounted on one side of said membrane and an anode element mounted on the other side of said membrane; and means for connecting the anode element of a first elongated flexible fuel cell in electrical contact with the cathode element of the next adjacent cell to enhance the power produced in said assembly.

According to yet another preferred aspect of the present invention, there is provided a fuel cell assembly that includes at least one elongated flexible fuel cell formed of multiple layers comprising: a central proton conducting membrane, an anode element attached to one side of said membrane, a cathode element attached to a second opposite side of said membrane and a supporting substrate for supporting said fuel cell, the substrate being of tubular cross section.

A realized advantage of the present invention is that a series of flexible fuel cells can be more cheaply manufactured in a manner which occupies much less space than conventionally known PEM-type fuel cells.

Still another advantage of the present invention is that an entirely self-contained fuel cell assembly can be manufactured, which can include at least one fuel source, without separately piping the fuel from an externally located source.

Additional objects, advantages, and features of the invention will become apparent to those of ordinary skill in the art upon examination of the following Detailed Description of the Invention in conjunction with the accompanying drawings.

DETAILED DESCRIPTION OF THE INVENTION

The present invention is herein described according to certain specific embodiments. It will be apparent, however, that other modifications can be made within the spirit and scope of the appended claims.

A first embodiment of a fuel cell assembly in accordance with the present invention is herein described with reference to FIGS. 1–4.

Figure 1:
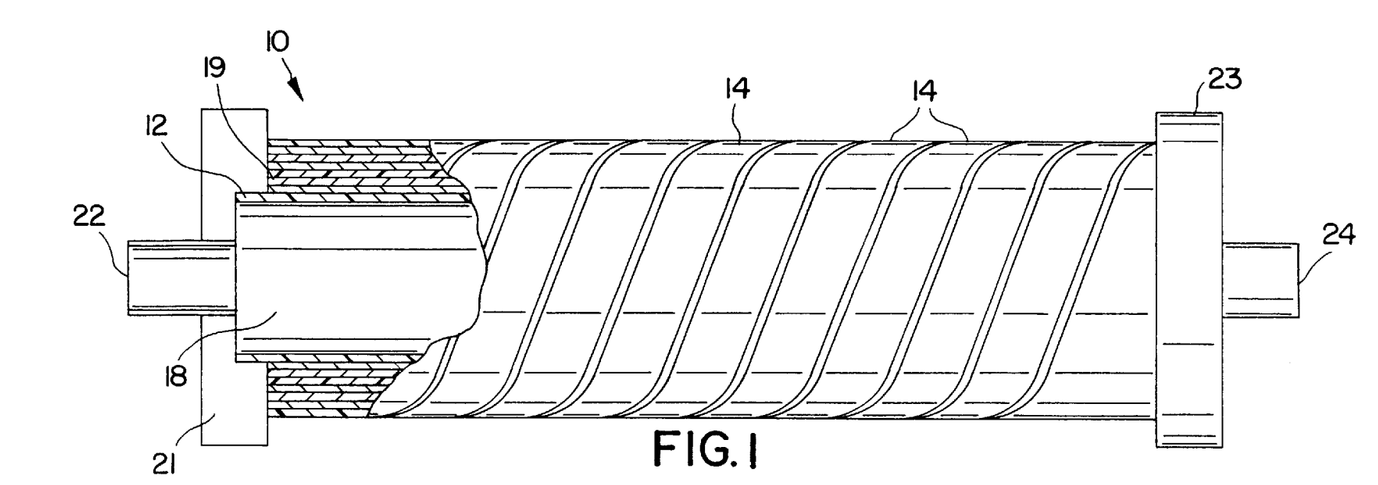
FIG. 1 is a partially cutaway perspective view of a tubular fuel cell assembly made in accordance with a first preferred embodiment of the present invention.

Referring specifically to FIG. 1, the fuel cell assembly 10 includes a porous hollow tubular substrate 12, shown partially in section, made from a gas-permeable material, such as polyethylene or polypropylene. In brief and according to this embodiment, the tubular substrate 12 forms a support for a plurality of individual flexible and elongated fuel cell assemblies 14 (hereinafter referred to as Membrane Electrode Assemblies or MEAs) which are arranged, such as by tape-wrapping the flexible MEAs onto the exterior surface 19 of the substrate, and aligning the assemblies in a side-by-side manner to form a completed power source, as is described in greater detail below.

Figure 2:
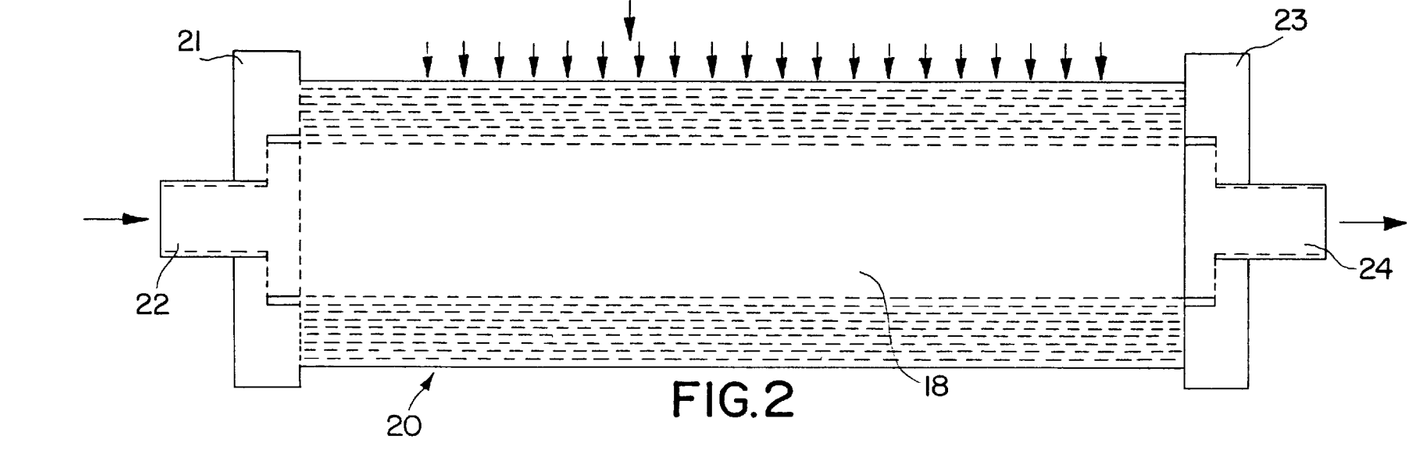
FIG. 2 is a systematic view of the fuel cell assembly according to FIG. 1.

Referring to FIG. 2, the tubular substrate 12 is contained within a fixture 20 including a pair of supporting end caps 21, 23. According to this embodiment, the fixture is of cylindrical cross-section, though it will be apparent that other geometries are suitable. One of the end caps 21 includes an entry port 22 and the remaining oppositely disposed end cap 23 includes an exit port 24, each extending from the interior 18 of the tubular substrate 12. In operation, the entry port 21 is fluidly interconnected to an external source (not shown) which supplies a quantity of a reactant fluid. As recited herein, fluid is defined as both gasses and liquids. Hydrogen gas ($H_2$) is used for purposes of this embodiment, though other reactants such as methanol, among others, can also be effectively utilized for achieving a suitable electrochemical reaction.

Still referring to FIG. 2, ambient air or any other suitable reactant is circulated outside the fixture 20; that is, external to the tubular substrate 12 in order to provide, for example, oxygen ions which are used in accordance with this embodiment to provide electrons for the electrochemical reaction which follows.

Figure 3:
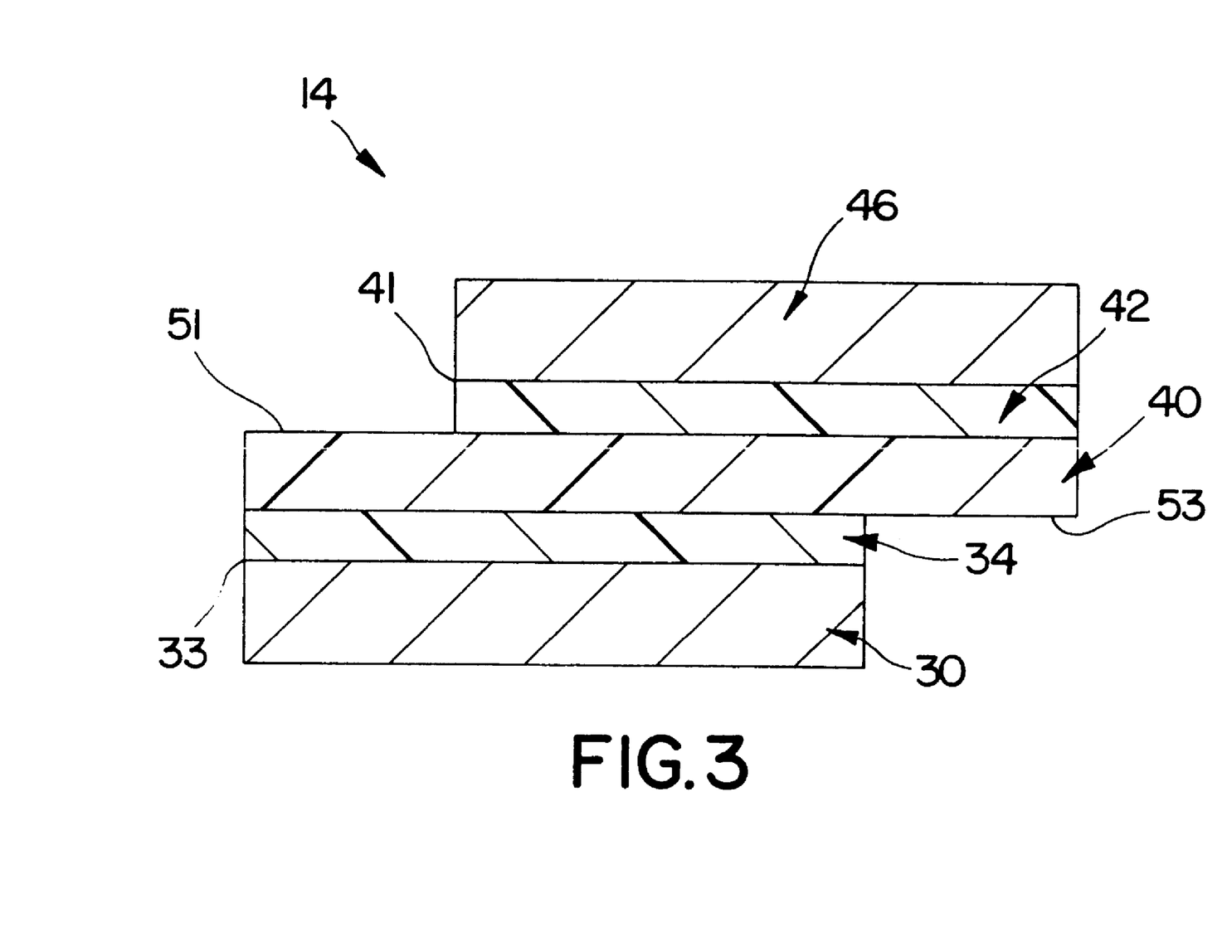
FIG. 3 is a partial cross sectional view of an individual multilayered fuel cell relating to the assembly of FIGS. 1 and 2.

A cross section of an individual flexible elongated MEA 14 is illustrated in FIG. 3. The assembly 14 includes a number of constituent sheet-like or strip layers which, from the bottom of the assembly, include an anode collector element 30, an anode electrode element 34, an ion conducting electrolytic membrane 40, a cathode electrode element 42, and an cathode collector element 46. The cathode electrode and cathode collector elements 42, 46 are preferably staggered relative to the anode electrode and anode collector elements 34, 30 of the assembly 14, respectively, to allow electrical interconnection between adjacently positioned MEAs 14, as detailed below.

The ion conducting electrolytic membrane 40 is, for example, a proton-conducting element, such as a perfluorosulfonic acid polymer (e.g. Nafion No. 117 manufactured by E. I. DuPont de Nemours and Co. of Wilmington, Del.) which allows a current density of approximately 0.1 ampere/$cm^2$ or greater. Other known membranes, however, such as Dow Chemical Co. Experimental XUS 13204.10 can also be utilized. According to this embodiment, the membrane 40 is an ionomer which is approximately 20 microns thick, with an 100 micron thick porous gas diffusion layer (not shown) applied on each facing side.

The anode electrode and the cathode electrode elements 34, 42 according to this embodiment are each made from porous carbon or graphite fiber strips, which are disposed on either facing side of the membrane 40. The fibers of each element 42, 34 are impregnated with an ionically conductive material for facilitating ion transport as well as a catalytic component layer. According to this embodiment, platinum catalyst is used as the impregnated material, though alternately other catalytic materials such as silver, palladium, gold and copper and or oxides thereof can be utilized. Preferably, the back side 41, 33 of each of the cathode 40 and anode sheets 32 are made hydrophobic by co-depositing the platinum with a polymeric coating, such as polytetrafluoroethylene (Teflon plastic), applied thereto by known means, such as by spray coating. The thickness of each element 42, 34 according to this embodiment is approximately 5 microns and the thickness of the impregnation is approximately equal to that of the proton conduction element (i.e.: 20 microns), though other suitable thicknesses may be contemplated. A large number of different materials, or combinations of materials and methods are well known in the art. These materials need to be conductive, yet allow fluid diffusion to the interfacial region to effect an electrochemical reaction.

Prior to describing the interconnection of individual fuel cell assemblies onto the tubular substrate 12, a general explanation of the mechanics of the electrochemical reaction is now provided with recourse to the preceding FIGS. 1–3. Assumption is made that at least one MEA 14 has been wound onto the exterior of the substrate 12, such as shown in the sectioned portion of FIG. 1.

As noted, a quantity of hydrogen reactant gas ($H_2$) is supplied into the interior 19 of the porous tubular substrate 12 from an external source. The substrate 12, being made from a fluid permeable material allows for example, the migration of the gas, while similarly oxygen is conveyed from the exterior of the assembly 10 inwardly toward the electrolytic membrane 40.

Because of the presence of the catalyst platinum layer on the anode electrode element 34, the hydrogen molecules reaching the anode are decomposed into hydrogen atoms and have their electrons stripped, resulting in the formation of H+ ions. These ions are able to penetrate the ion-permeable electrolytic layer of the membrane 40.

Similarly, the ambient air, containing the oxygen molecules is caused to flow through the fiber cathode electrode element 42. The presence of the impregnated catalyst (platinum) layer of the cathode electrode element 42, causes the oxygen molecules to be broken down into oxygen atoms and accept electrons, while reacting with the H+ ions which have reached the electrolytic membrane 40, producing water molecules.

The electrons produced by the dissolution of the hydrogen molecules are conveyed, as is known, to an external circuit (not shown) at the end of the fixture 20. The ongoing reaction continues to draw hydrogen (H+) ions created in the anode electrode element 34 to the catalyzed portion of the cathode element 42.

To achieve the preceding electrochemical reaction, the MEA 14 can minimally exist with the membrane 40 sandwiched between the fibrous electrode elements 34, 42 having the desired impregnation of electrically conductive material, catalyst, and hydrophobically coating to allow gas, but not water diffusion therethrough. According to this embodiment, the MEA 14 is individually manufactured in a strip-like form which allows tapewrapping onto the exterior of the tubular substrate 12. However, and also according to this embodiment it is necessary to collect the electrons formed as a result of the reaction.

Therefore and referring back to FIG. 3, the MEA 14 also includes an anode collector strip or element 30 which is attached to the back side 33 of the anode electrode 34 and is used to transport the charge produced from the reactant gas at the anode electrode 34. The anode collector element 34 is made from a conductive material such as high grade titanium, aluminum, titanium coated aluminum, stainless steel and conductive polymer composites, among others, which can be fabricated from braided wires, braided tubes, or perforated foils.

Similarly, the cathode collector element 46 is similarly placed adjacent the back side 41 of the cathode electrode element 42 for collecting the electrons which have migrated from the membrane 40 and which are directed to the aforementioned external circuit (not shown) in a manner known to those in the art. Each of the collectors 46, 30 have a width dimension which is coextensive with the width dimension of the cathode and anode electrode elements 42, 34. The collectors 46, 30 are then preferably arranged to present the staggered arrangement shown in FIG. 3.

Figure 5:
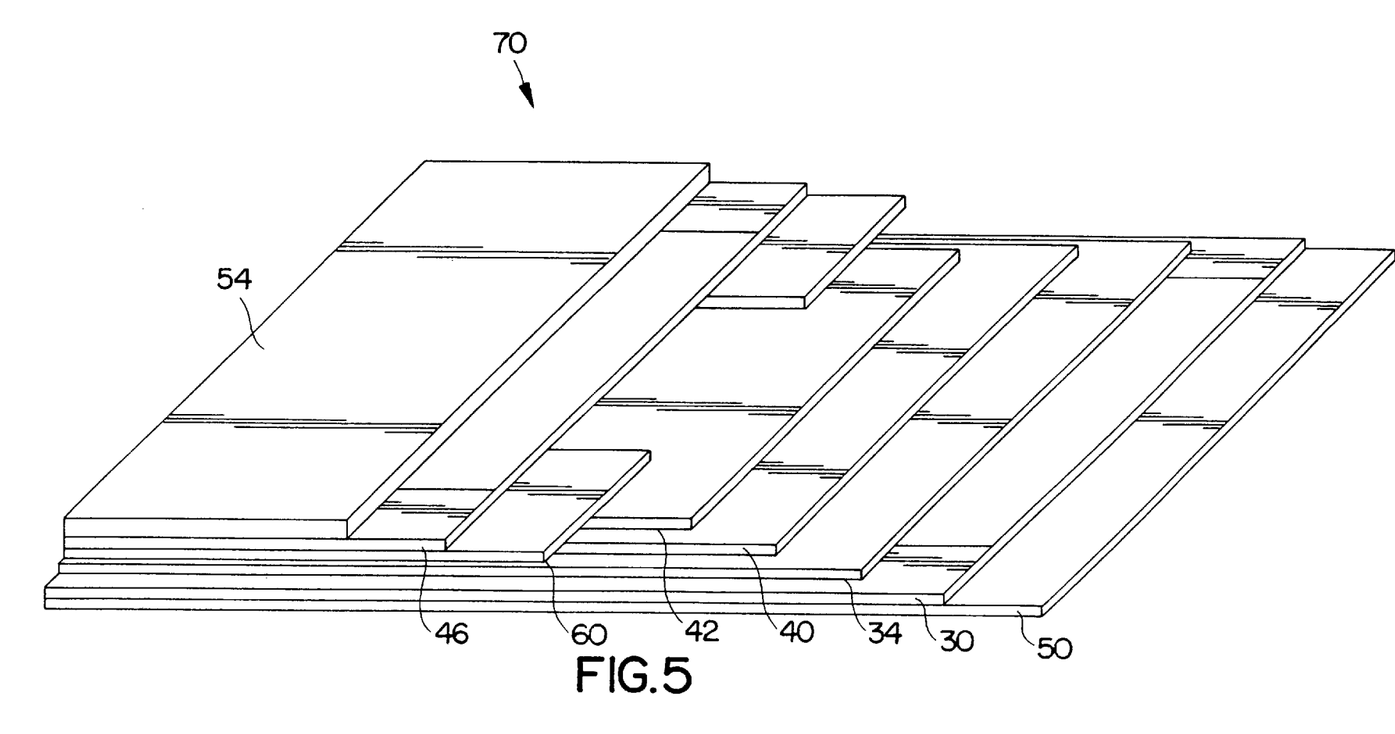
FIG. 5 is a partially sectioned view of a fuel cell assembly according to a second embodiment of the present invention.

An alternately designed MEA 70 is sectionally illustrated in FIG. 5 having other layers in addition to those previously described. For the sake of clarity, similar parts are labeled with same reference numerals. The MEA 70 in addition to the electrolytic membrane 40, cathode and anode electrodes 42, 34 and cathode and anode collectors 46, 30 also includes a porous inner skin 50 which covers the exterior of the tubular substrate 12 (not shown in FIG. 5) when wrapped thereto, and a similar porous outer skin 54 which covers the back side of the cathode collector sheet 46. An insulator sheet 60, made from PTFE or other suitable material is also provided between the cathode electrode sheet 42 and the cathode collector sheet 46 to prevent cross circuit.

As noted, each of the individual MEAs 14 are aligned onto the tubular substrate 12 in a side-by-side manner, as is shown in the diagrammatic FIG. 1, wherein each of the assemblies are manufactured in the strip-like form of either FIG. 1 or FIG. 5, and are tape wound or otherwise wrapped onto the exterior 19 of the tubular substrate 12. It should be noted that the MEAs 14 can be totally or partially assembled prior to applying them to the tubular substrate 12; that is, the assemblies 14 are attached in part or in toto. Alternately, each of the layers of each of the individual MEAs 14 can be applied to the tubular substrate 12 in situ in a series of sequential applications.

It should also be noted that a single MEA 14 can be used having a larger width dimension than those described which allows a single wrapping onto the exterior of the tubular substrate 12, rather than the accumulation of several MEAS 14. The assemblies can alternately be arranged as a series of flat plates.

However, and regardless of the application method, e.g. application of individual layers, tapewrapping of entire or partial individual MEAS to the tubular substrate 12, it is necessary to electrically connect each MEA 14 together in order to accumulate a suitable electrical charge suitable as a power supply.

Figure 6:
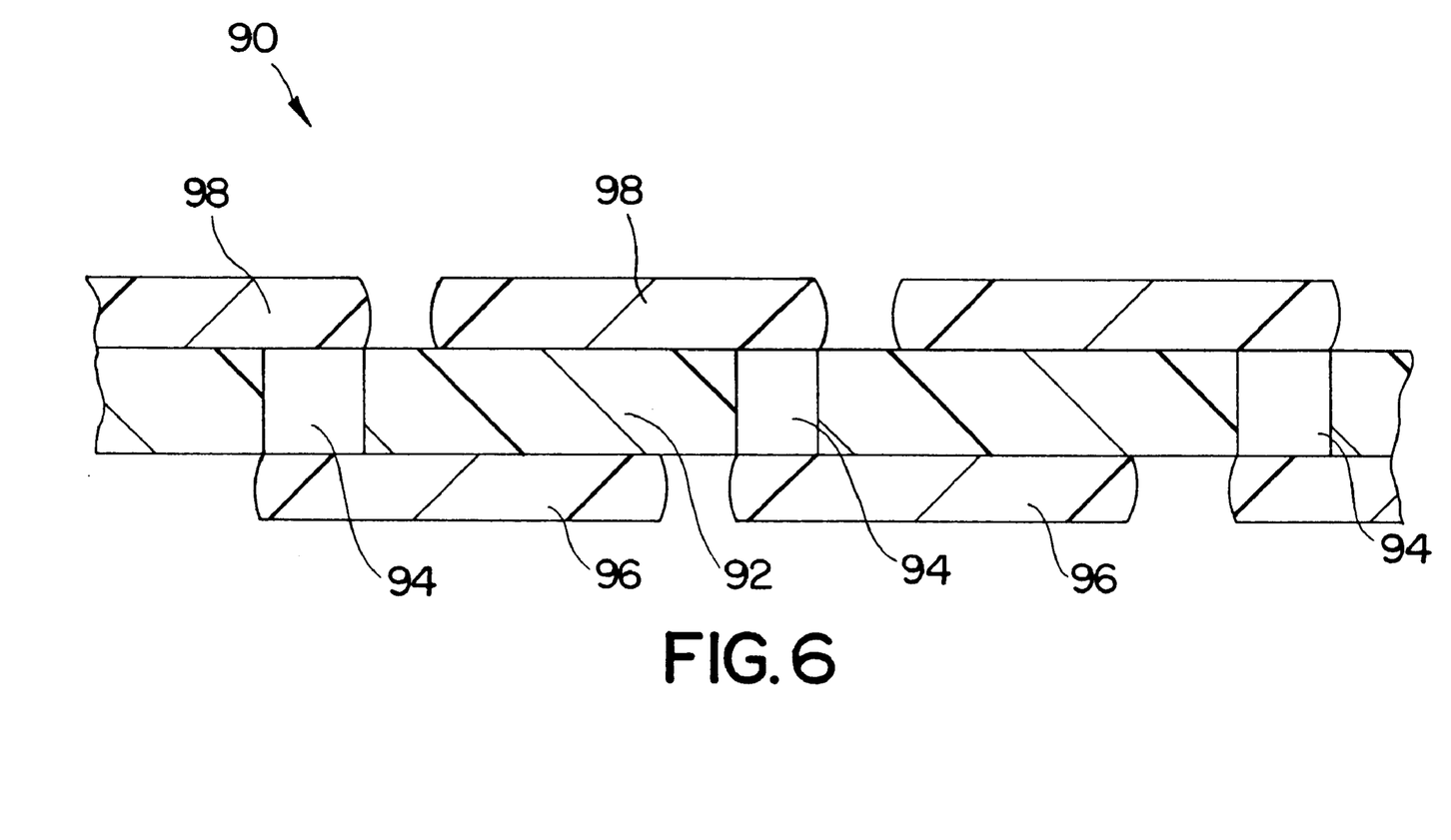
FIG. 6 is a partial sectioned side view of a fuel cell assembly according to a third embodiment of the present invention.

For the situation in which a single MEA 14 is deposited onto the tubular substrate 12, the positive (cathodic) portions and the negative (anodic) portions are each connected at the ends of the tube (not shown) in a parallel arrangement and are electrically collected at the end of the windings at the end caps 21, 23, FIG. 2. This is a viable, though not preferred connection in that significant power losses are possible in this design. An alternate design utilizing a series connection in a single multi-cell assembly is shown in FIG. 6, and is described in greater detail below.

Figure 4:
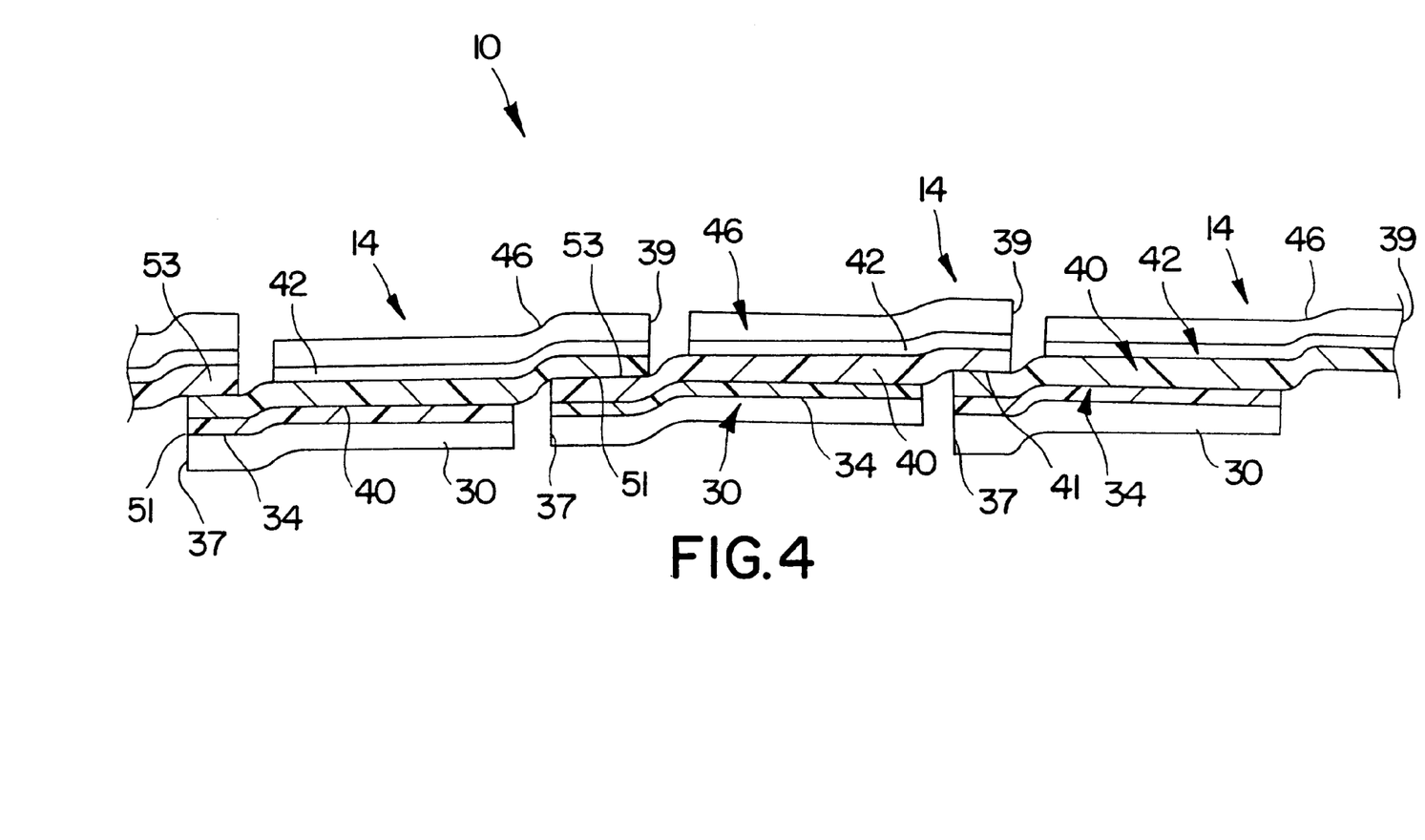
FIG. 4 is a partial sectional view of the fuel cell assembly of FIGS. 1–3, depicting a preferred method of electrically interconnecting the individual fuel cell assemblies.

FIG. 4 illustrates a preferred series interconnection between adjacently wrapped MEAs 14 according to the first embodiment of FIGS. 1–3.

Initially, according to this embodiment, the anode collector strips 30 are wound onto the tubular porous substrate 12 in a spaced relationship as shown in which a small gap is provided between adjacent strips. The strips can be placed onto the substrate by adhesion methods or other known techniques.

The second winding operation is the installation of the individual MEAs 14, each including the premanufactured membrane 40, which is sandwiched between the anode and cathode electrodes 34, 42 respectively. As noted previously, each MEA 14 is constructed in a staggered arrangement whereby the membrane 40 has a width dimension which extends across the width of the MEA while the cathode and anode electrodes 40,34 are offset by a predetermined amount.

When positioned according to FIG. 4, the identical anodic portion of each MEA 14 is aligned with the leading edge 37 of each wound collector strip 30. By spacing the anode collector strips 30, the anodic portions 51 of adjacent MEAs placed in contact with the cathodic portions 53.

Finally, the cathode collector strips 46 are wound onto the assembly 10 by wrapping a leading edge 39 of the strips in alignment with the cathodic portion 53 (the exposed cathode collector sheet 42). In this arrangement, the anode of a singular cell assembly 14 is electrically linked with the following cell's cathode. The above configuration provides a series connection, enhancing the voltage output of the fuel cell assembly 10. Typically, the individual PEM-type fuel cell units produce less than one volt, and therefore providing a series connection as described is a very advantageous and simple means for boosting the voltage of the entire fuel cell assembly.

An alternate method of providing an electrical interconnection between the individual fuel cell assemblies is illustrated in FIG. 6.

A single multicell assembly 90 includes a porous membrane 92, which is partially impregnated with an electrolytic media and is sandwiched between anode and cathode electrode elements 96, 98. However, the membrane 92 is rendered electronically conductive by addition of a series of discrete sections. The membrane 92 can be fabricated from a porous material, impregnated with a material such as a perfluorosulfonic acid polymer (Nafion) which allows ion transfer to occur therethrough, but which includes a series of banded portions 94 which include an electrically conductive material, such as carbons, titanium, 300 series stainless steels, and conductive polymers such as polyaniline. The conductive material is applied by known chemical deposition or mechanical methods; for example, a suspension of finely divided particles of electrically conductive material can be incorporated into the porous membrane in liquid form, e.g., as an ink. Alternately, electrically conductive portions 94 can be plated onto or into the membrane 92.

Providing a continuous sheet such as assembly 90 allows better sealing between the constituent individual fuel cells in the completed assembly. Furthermore, by providing the electrical portions relative to the leading edge of the anode and cathode electrodes 96, 98, respectively, a more efficient electrical connection is provided between adjacent cells. As described above, the anode and cathode elements 96, 98 can be applied through silk screening or other application technique.

According to this embodiment, the membrane 92 is approximately 20 microns in thickness and is therefore able to carry an electrical charge therethrough to form an electrical bridge.

In operation, the electrochemical reaction occurs in the manner previously described by the migration of charge through the electrode elements. The series electrical connection is provided by the incorporation of the electrically conductive material in the electrolytic membrane, allowing a voltage level to be achieved. The porous electrical film layer is approximately 100 microns thick and the thickness of the catalyst containing electrodes are approximately 5 microns each, though other larger thicknesses can be applied. In addition, the above embodiment preferably includes a fluid diffusion layer (not shown) which is applied on top of the catalyst to allow reactants to reach the reaction. The remainder of the membrane 92 remains electrically non-conductive.

The following claims define the present invention described herein. It will be readily apparent that other modifications and changes are easily imagined within the spirit and scope of the invention. For example, in the preceding first embodiment, if the anode collector portion is sufficiently rigid, such as by fabricating the anode collector from a braided wire, the need for the porous tubular substrate may be obviated.

What is claimed is:

1. A fuel cell assembly comprising:
   a tubular substrate made from a fluid permeable material;
   a plurality of elongated flexible polymer electrolyte membrane electrode assemblies wound in side by side relation onto said substrate, each membrane electrode assembly including a central proton exchange membrane, a cathode element mounted on one side of said membrane and an anode element mounted on the other side of said membrane; and
   means for serially connecting the anode element of a first elongated membrane electrode assembly in electrical contact with the cathode element of the next adjacent membrane electrode assembly.

2. The fuel cell assembly of claim 1, wherein the cathode and the anode elements of each membrane electrode assembly are formed of a catalyst containing carbon sheet that extends along the length and in contact with the proton exchange membrane of each membrane electrode assembly.

3. The fuel cell assembly of claim 1, wherein the mounted cathode and the anode elements of each membrane electrode assembly contain a hydrophobic coating along a side of said elements that is out of contact from said proton exchange membrane.

4. The fuel cell assembly of claim 1, including a flexible cathode charge collector mounted to each said cathode element and a flexible anode charge collector mounted to each said anode element, wherein said cathode, anode and membrane are sandwiched between said collectors.

5. The fuel cell assembly of claim 4, wherein each said charge collector is formed from a flexible electrically conductive material capable of being wound onto said tubular substrate.

6. The fuel cell assembly of claim 4, wherein the anode charge collector of one wound membrane electrode assembly is placed in electrical contact with the cathode charge collector of the next adjacent membrane electrode assembly.

7. The fuel cell assembly of claim 4, wherein each charge collector is fabricated of strands of hollow tubing and further includes means to move a fluid through said tubing to recover heat from said membrane electrode assembly.

8. The fuel cell assembly of claim 1, that further includes opposed end-caps mounted upon said tubular substrate, one said end-cap containing a fluid entry port and the other end-cap containing a fluid exit port.

9. The fuel cell assembly of claim 1, that further includes a porous outer skin that is placed over the outer charge collector of each membrane electrode assembly, said skin being made of a flexible plastic material.

10. The fuel cell assembly of claim 9, wherein the anode of each wound membrane electrode assembly faces said porous substrate and further includes means to pass reactant fluid through said porous substrate.

11. The fuel cell assembly of claim 4, wherein said cathode charge collector is exposed to a reaction fluid.

12. The fuel cell assembly of claim 1, said tubular substrate includes means for retaining an internal reactant source for the fuel cell assembly.

13. The fuel cell assembly according to claim 1, wherein said tubular substrate is cylindrical.

14. The fuel cell assembly of claim 1, wherein said means is an overlap of said anode element of said first elongated membrane electrode assembly and said cathode element of said next adjacent membrane electrode assembly.

15. The fuel cell assembly of claim 14, wherein said means is a plurality of discrete electrically conductive sections disposed in said central proton exchange membrane between overlapping portions of said anode element of said first elongated membrane electrode assembly and said cathode element of said next membrane electrode assembly.

16. A method of fabricating a fuel cell assembly comprising the steps of:
   providing a tubular substrate that permits gas to diffuse therethrough;
   winding upon said tubular substrate a first flexible elongated membrane electrode assembly that includes a central proton exchange membrane, a cathode element mounted on one side of said membrane and an anode element mounted on the opposite side of said membrane;
   winding upon said tubular substrate a plurality of flexible elongated membrane electrode assemblies in alignment with said first wound membrane electrode assembly; and
   electrically connecting said membrane electrode assemblies.

17. The method of claim 16, that further includes the step of forming the cathode and anode elements of a porous sheet and contacting the sheets with an electrically conductive material.

18. The method of claim 16, that includes the further step of coating the back side of each element facing away from said membrane with a hydrophobic material.

19. The method of claim 18, that includes the further step of covering each of the elements with a porous electrically conductive collector.

20. The method of claim 19, that includes the further step of connecting the collector covering the cathode of at least one membrane electrode assembly with the collector covering the anode of an adjacent membrane electrode assembly.

21. The method of claim 20, that includes the further step of fabricating the collector of a tubular mesh and passing a cooling fluid through said tubular mesh.

22. The method of claim 19, that includes the further step of wrapping the outermost collector with a porous outer protective skin.

23. The method of claim 22, that includes the step of passing a reaction fluid through the inside of said porous substrate and exposing the outside of said wrapped membrane electrode assemblies to a reaction fluid.

24. A fuel cell unit comprising a plurality of elongated flexible fuel cell assemblies that are each formed of multiple layers that include a central ion conducting membrane that is sandwiched between an anode sheet on a first side and a cathode sheet on a second side, wherein a portion of an anode sheet of a first fuel cell assembly overlaps a portion of a cathode sheet of an adjacent fuel cell assembly, and wherein an electrical connection exists through said ion conducting membrane between said portion of said anode sheet of said first fuel cell assembly and said portion of said cathode sheet of said adjacent fuel cell assembly.

25. The fuel cell unit of claim 24, wherein the substrate is a first charge collector in contact with one of the anode and cathode sheets and further includes a second charge collector in contact with the other of the anode and cathode sheets.

26. The fuel cell unit of claim 24, wherein said ion conducting membrane is a proton conducting membrane.

27. The fuel cell unit of claim 25, wherein said sheets are made from formulations, including carbon which are contacted with a catalytic coating and an outer hydrophobic material.

28. The fuel cell unit of claim 27, wherein said collectors are formed of material selected from a group of conductive materials including wire mesh, porous metal foil, polymer composites or braided tubing.

29. The fuel cell unit of claim 27, including means for bringing a reaction fluid in diffusing contact with one of said carbon sheets and a reaction fluid in diffusing contact with the other of said carbon sheets.

30. The fuel cell of claim 27, wherein said catalytic coating is platinum.

31. The fuel cell unit of claim 24, wherein said central membrane has portions made from an electrically conductive material, at least one said portion forming an electrical bridge between an anode of an membrane electrode assembly and a cathode of an adjacent membrane electrode assembly.

* * * * *